United States Patent [19]

Gardner

[11] 4,294,751

[45] Oct. 13, 1981

[54] POLYESTER RESIN COMPOSITIONS

[75] Inventor: Hugh C. Gardner, Somerville, N.J.

[73] Assignee: Union Carbide Corporation, New York, N.Y.

[21] Appl. No.: 135,905

[22] Filed: Apr. 14, 1980

Related U.S. Application Data

[63] Continuation-in-part of Ser. No. 34,997, May 1, 1979, abandoned.

[51] Int. Cl.[3] .......... C08L 67/02

[52] U.S. Cl. .......... 260/40R; 525/36; 525/39; 525/40; 525/43; 525/48; 525/49; 525/438; 525/445; 528/303; 528/304

[58] Field of Search .......... 260/40 R; 525/36, 39, 525/40, 43, 48, 49, 438, 445; 528/303, 304, 176

[56] References Cited

U.S. PATENT DOCUMENTS

| | | | |
|---|---|---|---|
| 2,812,313 | 11/1957 | Nischk et al. | 525/36 |
| 2,813,055 | 11/1957 | Nischk et al. | 525/34 |
| 2,824,821 | 2/1958 | Nischk et al. | |
| 3,692,736 | 9/1972 | Besnard et al. | 260/40 R |
| 3,721,642 | 3/1973 | Schalin et al. | 260/40 R |
| 3,723,390 | 3/1973 | Carpenter et al. | 528/304 |
| 3,736,278 | 5/1973 | Wada et al. | 260/22 CB |
| 3,766,129 | 10/1973 | Pesez | 260/40 R |
| 3,784,586 | 1/1974 | Thomas et al. | 525/21 |
| 4,102,944 | 7/1978 | Fukuyama et al. | 525/48 |
| 4,137,279 | 1/1979 | Smith et al. | 525/49 |

FOREIGN PATENT DOCUMENTS

| | | |
|---|---|---|
| 2000494 | 1/1979 | United Kingdom . |

*Primary Examiner*—Lucille M. Phynes
*Attorney, Agent, or Firm*—Donald M. Papuga

[57] ABSTRACT

This invention involves a curable molding composition comprising a mixture of (a) a polyester of the following formula:

$$[HO\overset{O}{\overset{\|}{C}}-CH=CH\overset{O}{\overset{\|}{C}}-O]_n-R-(OH)_m \quad (I)$$

wherein n has an average value between about 1.5 and 2, m is 2-n, R is the hydroxyl-free residue of a predominantly hydroxyl terminated polyester having a molecular weight not exceeding about 1500 and obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, the ethylene and propylene oxide derivatives of 2,2-bis(4-hydroxyphenyl)propane, and mixtures thereof, and mixtures of ethylene glycol and said diols, with a dicarboxylic acid or anhydride selected from the class consisting of maleic and anhdride, fumaric acid, ortho-phthalic acid and anhydride, isophthalic acid, terephthalic acid, carbic acid and anhydride, and mixtures thereof, (b) maleic anhydride, (c) an ethylenically unsaturated monomer which forms a homogeneous mixture with and is copolymerizable with (a) and (b), and (d) one or more reinforcing fibers having a melting point or a glass transition temperature above about 130° C.

7 Claims, No Drawings

POLYESTER RESIN COMPOSITIONS

This application is a continuation-in-part application of Ser. No. 034,997, filed May 1, 1979, now abandoned.

This invention is directed to a curable molding composition comprising a particular polyester, maleic anhydride, ethylenically unsaturated monomer, and one or more fibers.

The crosslinkable polyesters in these compositions are characterized by a special structure in which substantially all are terminated by half acid ester groups derived from maleic anhydride.

Fiberglass has been widely used as a reinforcement in the manufacture of thermoset molded articles. These types of articles have been termed "Glass Reinforced Plastics" (GRP) and "Glass Fiber Reinforced Plastics" (GFRP).

Unsaturated polyester resins are used primarily as the resin component in many of these glass reinforced thermoset plastics. They consist of unsaturated polyesters dissolved in a polymerizable ethylenically unsaturated monomer. Typically, these unsaturated polyesters are formed by reacting an unsaturated diacid (or anhydride) with a nearly equivalent amount of dihydric alcohol at temperatures above about 200° C. for several hours. Maleic anhydride is the most common acid component utilized. The dihydric alcohols which are commonly used to make these polyesters include ethylene glycol, 1,2-propylene glycol, dipropylene glycol, diethylene glycol, and the like. Modifying amounts of other diacids, such as phthalic acid, isophthalic acid, terephthalic acid, or adipic acid are also commonly employed. Maleic anhydride and phthalic anhydride are two anhydrides that are often used. Unsaturation which is provided by maleate or fumarate groups within the backbone of the polyester takes part in the crosslinking, or curing, of unsaturated polyester resins.

Commercial two stage unsaturated polyesters are made with the diols and diacids specified in this application. These materials are typically made by a two step process wherein the saturated or aromatic diacid component is reacted with an excess of diol at temperatures above 200° C. When the acid number of the mixture falls below about 20, the unsaturated diacid or anhydride component is added to the entire reaction mixture in a molar ratio of about 1 mole of acid for every 2 moles of OH. The polymerization is continued until the unsaturated component has been converted largely to diesters. Molecular weight build up accompanies this process. Accordingly, polyesters with molecular weights (Mn) of about 1000 to 5000 are produced. The chains are terminated with carboxyl groups and hydroxyl groups. The acid numbers of commercial polyesters are typically in the range of 10 to 40. Often hydroxyl numbers are slightly higher. Virtually no unreacted maleic anhydride is present in commercial resins.

These aforedescribed polyester resins have been employed in the manufacture of a variety of glass reinforced products by different types of processes. The processes of forming glass reinforced products are generally in two categories, i.e., wet lay up and thickened processes. Wet lay up processes include the following steps: pre-impregnation of a fibrous mass with resin, followed by compression molding; preforming in which cut fiber and resin are sprayed onto a mold form itself; mat molding, in which liquid resin is poured onto a mat while the mat is disposed in a compression mold; bulk molding, in which a non-thickened mixture of staple fiber and polyester resin are poured into a mold.

In thickened processes, the carboxyl groups on the polyester react with an inorganic alkaline earth metal oxide or hydroxide such as, magnesium oxide and calcium hydroxide, to increase the viscosity of the fiber containing resin so that the mixture can then be handled and deposited within the framework of a mold. The final viscosity must be high enough to give a nontacky product, but low enough to allow adequate flow of the mixture in the mold. Careful control over the polyester acid number is required in thickened systems so that the rate of thickening allows for good fiber wet out and the final paste viscosity remains in the moldable range. Many commercial unsaturated polyesters are manufactured to meet these requirements.

Thickened bulk molding compounds, however, have not been widely used in injection molding since their viscosities are normally higher than is desirable for effective molding, and the equipment required to mold the high viscosity thickened bulk molding compound is extremely expensive, large, and cumbersome to operate. A further disadvantage in using thickened bulk molding compounds in an injection molding process is that the fibers must be of very short length in order to be effectively distributed throughout the mold. The short lengths of the fibers minimizes the effectiveness of the reinforcement so that the resulting molded article does not have optimum performance characteristics particularly, strength properties.

Some polyester resin systems have been developed which provide good surface properties to the molded product. These polyester resin systems are used in the manufacture of "Class A" molded products employed in the automotive industry. These products have extremely low profile surfaces which are free of warpage, undulations, and fiber protrusions. This low profile results from adding a low profile additive to the BMC or SMC formulation. A low profile additive is a thermoplastic compound which contains a sufficient number of carboxylic acid groups allowing it to become intricately bound into the resin system so that it is not exuded therefrom. Low profile additives can also be utilized in wet lay up processes to form glass reinforced products. Non-carboxylated containing thermoplastics are very effective low profile additives for resin systems used in the wet lay up process although carboxylated thermoplastics presently available for the same purpose can be so utilized.

The glass fiber reinforced polyester resin systems which are used to form "Class A" products typically contain from about 15 to 40 weight percent of glass fiber. These fiber reinforced polyester resin systems are used to mold products where surface appearance is very important, but strength properties are not necessarily as important. However, structural products are expected to have high strength properties. Consequently, "Class A" products have not been used in automotive applications where structural integrity is a critical factor.

Recently, a series of glass fiber reinforced polyester compositions have been developed which utilize the thickening characteristics of SMC, BMC, and the like, but which contain extremely high concentrations of glass fiber. For example, a series of polyester compositions containing from about 50 to about 75 weight percent of glass fibers have been developed. These polyester compositions can be used in making molded products, but typically, they do not possess the desirable surface characteristics which provide a "Class A" product. However, their strength characteristics, which are supplied by the high concentration of glass fibers, provide unique markets for these materials. The fibers in these reinforced compositions are either unidirectionally aligned, as from continuous filament tow, or are randomly distributed in long fibers in a polyester mat, or from a combination thereof, to supply enhanced multidirectional strength to the molded article. The high glass fiber containing polyester compositions are sheet molding compounds, XMC, HMC, (XMC and HMC are trademarks of PPG Industries, Inc.) and MSMC-R-Fiber content such as 50–65, (trademarks of Owens Corning Fiberglass Corp.). These high glass fiber content resin systems are molded only by compression molding procedures.

A novel process for producing fiber reinforced compositions by injecting resin into a mold containing a fibrous web is described in U.S. patent application Ser. No. 035,011 entitled "Molding Process and Apparatus Therefore", and filed on May 1, 1979, now abandoned in the name of R. Angell, Jr., which is incorporated herein by reference. In this application a process for rapidly fabricating fiber reinforced thermoset resin articles is described. The fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold.

The process, as described in said U.S. patent application Ser. No. 035,011, does not require a maturation step. The need for thickening in the resin formulation is thus eliminated. A major requirement for the process is low resin viscosity to avoid movement of the reinforcing fibers during resin injection. Many types of resins can be used in the resin injection process described in said application Ser. No. 035,011, including polyesters, epoxides and polyurethanes.

Unsaturated polyesters of the type utilized in thickened processes are suitable provided that their viscosities are sufficiently low. Typically, the desired viscosity is achieved by diluting the resin used in thickened processes with additional ethylenically unsaturated monomer.

It has been found that the resins of this invention, which contain polyesters of structure (I), may be injection molded by the process of Ser. No. 035,011 to yield fiber reinforced articles having an outstanding combination of mechanical properties.

Molecular structures derived from the reaction of a dicarboxylic acid and a dihydric alcohol are described by Thomas et al., U.S. Pat. No. 3,784,586, patented Jan. 8, 1974. Thomas et al. depicts the reaction of two moles of maleic anhydride with one mole of dihydric alcohol to produce a composition which is characterized as a copolymerizable oligoester having maleic acid end groups in combination with vinyl monomers and a method for preparing the composition. According to the patent, maleic anhydride is reacted with one or more polyhydroxylated compounds in the ratio of a mole of maleic anhydride per hydroxyl group of the polyhydroxylated compound or compounds at a temperature within the range of 50° C. to 100° C. until the reaction mixture has a hydroxyl number below or equal to 20. Thereafter, at a temperature between room temperature and 100° C., a cross-linking vinyl monomer and a polymerization inhibitor are added. According to the patent, it is essential that the reaction temperature between maleic anhydride and polyhydroxylated compound not exceed 100° C.

The compositions of this invention are based on the reaction of maleic anhydride with a hydroxyl terminated polyester. These polyesters contain at least two ester bonds and are formed by a high temperature reaction between polyols and acids. They may contain unsaturation and can have higher molecular weights than are found with typical dihydric alcohols. Furthermore, the products of the reaction between the hydroxyl terminated polyester and maleic anhydride form a liquid mixture with styrene at room temperature.

U.S. Pat. No. 2,813,055 describes the preparation of branched polyesters from the reaction of dicarboxylic acids or their anhydrides and a trihydric alcohol. The resulting polyesters are branched and contain essentially only hydroxyl end groups. The hydroxyl groups of this polyester are then reacted with maleic anhydride to terminate the polyester with carboxyl groups. The polyester can be reacted with styrene. The resulting products are employed as adhesives for bonding all types of materials, especially metals. This patent teaches that polyesters made from reactants containing ether groups are especially preferred.

In contrast to the polyesters described in U.S. Pat. No. 2,813,055, the polyesters of this invention are not limited to those containing ether groups. While said patent discloses the use of ether-containing polyesters as adhesives for bonding metal surfaces, there is no mention of using these compositions for the preparation of rigid fiber reinforced composite articles.

U.S. Pat. No. 2,824,821 describes polyesters similar to those of U.S. Pat. No. 2,813,055 although they may be linear and do not require ether groups in their structure. The polyester compositions of U.S. Pat. No. 2,824,821 are used as adhesives for bonding all types of materials, especially metals. However, the polyester compositions of U.S. Pat. No. 2,824,821 are not described as being fiber reinforced or as useful in the preparation of rigid fiber reinforced composite articles as are the compositions of this invention.

THE INVENTION

This invention is directed to a curable molding composition comprising a mixture of: (a) a polyester of the formula:

$$[HO\overset{O}{\overset{\|}{C}}-CH=CH\overset{O}{\overset{\|}{C}}-O]_n-R-(OH)_m \quad (I)$$

wherein n has an average value between about 1.5 and 2, m is 2-n, R is the hydroxyl-free residue of a predominantly hydroxyl terminated polyester having a molecular weight not exceeding about 1500 and obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, the ethylene and propylene oxide derivatives of 2,2-bis-(4-hydroxyphenyl)propane, and mixtures thereof, and mixtures of ethylene glycol and said diols, with a dicarboxylic acid or anhydride selected from the group consisting of maleic acid and anhydride, ortho-phthalic acid and anhydride, isophthalic acid, terephthalic acid, fumaric acid, carbic acid and anhydride, and mixtures thereof, (b) maleic anhydride, (c) an ethylenically unsaturated monomer which forms a homogeneous mixture with and is copolymerizable with (a) and (b), and (d) one or more fibers having a melting point or a glass transition temperature above about 130° C.

Cured articles made from the molding composition of this invention have higher mechanical properties compared to articles produced from polyesters with higher molecular weights and lower acid numbers.

The polyesters depicted in formula (I) are distinct from commercial two stage unsaturated polyesters. The former possess higher acid numbers and lower molecular weights due to the stoichiometry of about 0.75 to 1.2 moles of maleic anhydride per mole of hydroxyl. In two stage commercial polyesters, a molar ratio of 0.5 moles of maleic anhydride per hydroxyl is typically used in the second step.

The compositions of this invention are also distinct from commercial unsaturated polyester resins in that they contain unreacted maleic anhydride.

The polyesters of formula (I) are prepared by a stepwise process. The first step is the formation of a relatively low molecular weight polyester which is predominantly hydroxyl terminated. This polyester is thereafter reacted with maleic anhydride. This results in carboxyl termination of a substantial portion of the polyester hydroxyl groups and provides ethylenic unsaturation at the ends of the polyester chain. A small portion of the maleic anhydride remains unreacted due to the equilibrium nature of said reaction. This reaction mixture is thereafter mixed with an ethylenically unsaturated monomer. This monomer is capable of both forming a homogeneous mixture with and is copolymerizable with the carboxyl terminated polyester and maleic anhydride.

The predominantly hydroxyl terminated polyester used in this invention to produce the carboxyl terminated polyester is typically prepared from (a) a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, the ethylene and propylene oxide derivatives of 2,2-bis(4-hydroxyphenyl)propane, and mixtures thereof and mixtures of ethylene glycol and the aforementioned diols and (b) a dicarboxylic acid or anhydride selected from the class consisting of maleic acid and ahydride, fumaric acid, ortho-phthalic acid and anhydride, isophthalic acid, terephthalic acid, carbic acid and anhydride and mixtures thereof. The diol and dicarboxylic acid or anhydride are heated until a polyester is formed possessing an acid number of less than about 25. When the molar ratio of diols to dicarboxylic acids is greater than about 1.5, the hydroxyl number is typically in excess of about 65. Hydroxyl numbers for the hydroxyl terminated polyester can be as high as 250 and greater. Polyester esterification catalysts such as amines or tin compounds may optionally be used to increase the rate of formation of the polyester.

Amine catalysts suitable for use in the preparation of the predominantly hydroxyl-terminated oligomers include by way of illustration, the following:

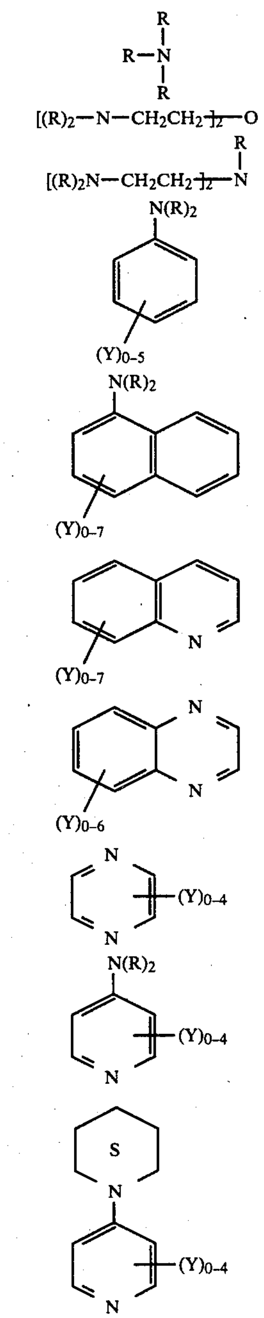

-continued

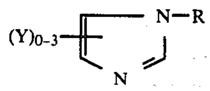

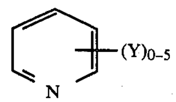

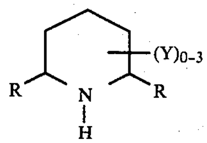

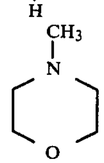

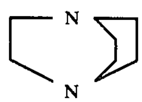

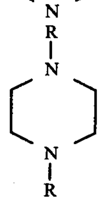

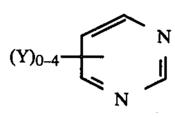

wherein the R's are independently selected from alkyl of 1 to 8 carbon atoms such as, $CH_3$, $C_2H_5$, $C_3H_7$, $C_4H_9$, and aralkyl of 7 to 15 carbon atoms such as

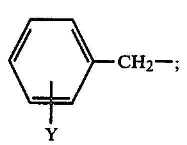

Y is independently selected from alkyl of 1 to 4 carbon atoms, alkoxy of 1 to 4 carbon atoms and halogen. Also included herein are 1,5-diazabicyclo [5.4.0] -undec-5-ene and 1,5-diazabicyclo [4.3.0] -non-5-ene.

Suitable tin compounds are organic tin salts or oxides which are typically employed as catalysts in the polyester art or other arts such as, the manufacture of urethane foams, the conversion of caprolactone into polycaprolactone in the presence of an active hydrogen compound, and the like. A specific illustration of a number of such tin compounds are stannous octoate, dibutyltin oxide, dibutyltin dilaurate, and a solution of tin (II) bis(trifluoromethylsulfonate) sold by the Minnesota Mining and Manufacturing Company, Minneapolis, Minn. under the trademark of "L-4429."

The catalysts are used in amount of from about 0.01 to about 3.0 percent of the weight of the initial reactants.

The polyester of formula (I) is conveniently prepared by reacting the predominantly hydroxyl terminated oligomer with maleic anhydride in a stoichiometric ratio of one mole of hydroxyl per 0.75 to 1.2 moles of maleic anhydride. A catalyst may optionally be used to carry out this reaction. These catalysts are basic compounds. The basic compounds are selected from the amines described, supra, a metal salt of an alcohol or carboxylic acid, or a metal oxide or hydroxide.

The metal salt of the alcohol includes sodium methoxide, potassium ethoxide and lithium isopropoxide. The metal salt of a carboxylic acid includes sodium acetate and potassium benzoate. The metal oxide or hydroxides include the alkali metal hydroxides such as potassium hydroxide, and sodium hydroxide. Magnesium oxide is an example of a suitable metal oxide. Characteristic of all the bases which are suitable for use in this invention is that when 1 gram of the basic compound is dissolved in 100 milliliters of water the pH is greater than 7.

A preferred basic compound is a secondary or tertiary amine. These amines have $pK_b$'s in the range of 3 to 12. The base is used in amounts of from about 0.005 to about 5 and preferably, from about 0.01 to about 2 weight percent based on the combined weight of the hydroxyl terminated polyester and the maleic anhydride used in making the compositions of this invention.

In this invention, all of the terminal carboxyl groups in the polyester (I) can be in either the maleate form or the fumarate form. Generally, greater than 75 percent of the terminal carboxyl groups will possess the maleate structure.

The polyester of this invention may contain internal polymerizable double bonds, due to the use of, for example, maleic anhydride in the formation of the hydroxyl terminated polyester. This unsaturation is not undesirable, since it serves to enhance the cross-linking density which in turn increases stiffness of the cured resin. High stiffness in the cured resin is very desirable since it results in fiber reinforced composite articles possessing high stiffness. This same kind of stiffness can be achieved through the use of aromatic containing dicarboxylic acids and anhydrides such as phthalic acid and anhydride, isophthalic acid and terephthalic acid. To some degree rigidity is added to the backbone of the polymer by the presence of carbic acid. Mixtures of polyesters of this invention, wherein one polyester possesses internal unsaturation and the other does not, are also very desirable.

The ethylenically unsaturated monomer employed in the composition of this invention is one which forms a liquid homogeneous mixture with and is copolymerizable with the polyester depicted by formula (I) and maleic anhydride.

Suitable ethylenically unsaturated monomers which may be employed in the practice of this invention are one or more monomers which contain a —CH=C< group, and preferably a $CH_2$=C< group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also, the monomers include vinyl ethers and esters, e.g., vinyl acetate, vinyl propionate, methyl vinyl ether, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene.

The predominantly hydroxyl terminated polyester of this invention is prepared by heating an excess of one or more of the diols with one or more of the dicarboxylic acids or anhydrides. The mixture is heated at a temperature of from about 150° C. to about 250° C. until a polyester is formed possessing an acid number of less than about 25, preferably less than about 15 and in the most desirable embodiment, less than about 5. Under these conditions, the hydroxyl numer is typically in excess of about 65, and most desirably in excess of about 100. Hydroxyl numbers for the polyester can be 250 or greater.

Typically, the reaction is carried out for a period ranging from about 4 to about 24 hours. Standard techniques employed in the art for making polyester resins may be employed to make the hydroxyl terminated polyester. Frequently, to control the molecular weight of the product, a 25 to 500 percent molar excess of the diol is employed in the reaction. When the desired degree of esterification of the acid has been achieved, this excess may be stripped therefrom by, for example, vacuum distillation. The amount of unreacted diol remaining in the product amounts to no more than about 10 percent by weight.

The polyester of formula (I) is prepared by reacting the hydroxyl terminated polyester and maleic anhydride in a molar ratio of about 0.75 to about 1.2 moles of maleic anhydride per mole of polyester hydroxyl. Since the reaction between the hydroxyl groups and maleic anhydride is reversible, a portion of the anhydride remains unreacted and is part of the final composition. In the absence of catalyst, the reaction typically requires from about 0.5 to about 8 hours at temperatures of from about 80° C. to about 150° C.

The reaction is carried out until more than about 75 percent of the maleic anhydride has reacted with the hydroxyl terminated polyester. At 120° C., this is generally achieved in about 3 hours. Under these conditions the maleic anhydride which reacts with the hydroxyl terminated polyester is present mainly as a maleate half ester. Less than 5 percent of the maleic anhydride reacts to form maleate diesters.

In the presence of a catalyst as heretofore described, the reaction of the hydroxyl terminated polyester oligomer and maleic anhydride can be carried out at temperatures of from about 60° to about 130° C. for a period of from 0.2 to about4 hours.

After more than about 75 percent of the maleic anhydride has reacted with the polyester oligomer, the reaction mixture is cooled to a temperature of about 120° C. or less. An ethylenically unsaturated monomer is then added as the reaction mixture is agitated. The temperature of the reaction mixture is lowered by the addition of the ethylenically unsaturated monomer. The homogeneous liquid mixture is then cooled to room temperature, or to whatever intermediate temperature is desired.

The reaction mixture containing the polyester depicted in formula (I) and unreacted maleic anhydride can be characterized by the use of acid numbers. The acid number is defined as the milligrams of KOH needed to neutralize 1 gram of product. Two methods are used to measure acid numbers. The first involves dissolving a sample in a pyridine/methanol mixture and titrating against aqueous KOH. The second involves dissolving a sample in aqueous pyridine and then titrating against KOH. The former determines maleic anhydride as a monoacid; the latter determines maleic anhydride as a diacid.

By use of these procedures the amount of maleic anhydride present in the composition can be determined, as shown in formula II as follows:

$$\text{Mole \% of unreacted maleic anhydride} = \left[\frac{\underset{\text{(aqueous pyridine)}}{\text{Acid No.}} - \underset{\text{(pyridine/methanol)}}{\text{Acid No.}}}{\text{Acid No. (pyridine/methanol)}}\right] \times 100 \qquad \text{(II)}$$

The acid number of the polyester of formula (I) can be determined by use of formula III as follows:

$$\text{Acid No. of (I)} = \text{Acid No. (pyridine/methanol)} - [\text{Acid No. (aqueous pyridine)} - \text{Acid No. (pyridine/methanol)}] \qquad \text{(III)}$$

When measured by the aqueous pyridine method, the acid numbers of polyester/maleic anhydride reaction product mixtures range from about 70 to about 320. Preferably they are in the range of 80 to 200. By the pyridine/methanol mixed solvent method, the preferred range is from about 65 to about 180.

The molecular weight (Mn) of the polyester of formula (I) ranges from about 400 up to about 1700, and preferably from about 500 to about 1400.

The compositions of this invention are low viscosity liquids. When they contain 30 percent by weight of styrene as the ethylenically unsaturated monomer, the solution viscosities at 23° C. range from about 30 to about 1400 centipoises. At higher styrene contents, the viscosities are lower.

In the resinous portion of this composition, the combination of the polyester of formula (I) and maleic anhydride are present in amounts of from about 95 to about 25, preferably from about 80 to about 35 weight percent and the ethylenically unsaturated monomer is present in amounts of from about 5 to about 75, preferably from about 20 to about 65 weight percent.

At least 75 weight percent and preferably greater than 80 weight percent of maleic anhydride is present as the half ester in formula (I).

In order to avoid premature crosslinking reactions in the composition, it is desirable to add polymerization inhibitors. These include tertiary-butyl catechol, hydroquinone monomethyl or monoethyl ethers, benzoquinone, tertiary-butyl hydroquinone, methyl hydroquinone and mixtures thereof, such as mixtures of hydroquinone monomethyl ether and benzoquinone. These polymerization inhibitors are used in amounts of from about 30 to about 600 parts per million by weight.

The compositions of this invention can be cured by free radical mechanisms such as, electron beam radiation, actinic radiation, azo and peroxide curing agents such as those which are described by Gallagher, et al "Organic Peroxides Review⇄, Plastics Design & Processing, July, 1978, pages 38–42, and August, 1978, pages 60–67, inclusive. The technology disclosed in those two articles are incorporated herein by reference. The choice of the specific peroxide or azo initiators for the purpose of curing the composition of this invention is within the purview of those having skill in this art. The manner in which such peroxides and azo initiators operate to effect a desirable cure is generally characterized in the aforementioned articles.

Illustrative of a few such curing agents are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.25 to about 5.0 weight percent, preferably from about 0.5 to about 2.5 weight percent, and most preferably, from about 0.75 to about 2.0 weight percent, based on the weight of the polyester (I), maleic anhydride and the ethylenically unsaturated monomer.

The fibers which are suitable for use in this invention as reinforcing agents which have a melting point or a glass transition temperature above about 130° C. These fibers include fiberglass, carbon fibers, aromatic polyamide fibers (such as aramid fibers sold by E. I. DuPont Nemours, Wilmington, Del. under the trademark of Kevlar), metal fibers, such as aluminium and steel fibers, boron fibers and the like.

The carbon fibers include those having a high Young's modulus of elasticity and high tensile strength. These carbon fibers may be produced from "graphitizable" materials such as is described in U.S. Pat. No. 4,005,183.

The preferred fibers are fiberglass, carbon fibers and aromatic polyamide fibers.

The fibers which are suitable for use in this invention have a length of at least ¼ inch and the average length is at least ½ inch. Fibers with different lengths exceeding ¼ inch may be used, provided that at least about 50 percent of the fibers have lengths greater than ½ inch. Preferred fibers lengths are from 1 to 2 or more inches. Continuous filaments may also be used.

The composition contains from about 15 to about 80, preferably from about 35 to about 80, and most preferably from about 35 to 70 weight percent of fiber.

The compositions of this invention are particularly useful for the manufacture of rigid fiber reinforced molded articles. A preferred procedure for producing a molded article from this composition is described in copending U.S. patent application Ser. No. 035,011, supra.

In said U.S. patent application Ser. No. 035,011 the apparatus for producing the molded article comprises (a) a heatable matched metal die mold containing one or more cavities therein with means for opening said mold to expose said cavities, and means for controlling the injection of a thermosettable organic liquid to said cavities when the mold is closed, (b) means associated with said mold, whereby an interlocked mass of fibers is provided in a portion of the cavity thereof, when the mold is open to receive such cavities and prior to the injection of thermosettable organic liquid to such cavities when the mold is closed, (c) accumulator means associated with said mold which can contain a thermosettable organic liquid transportable to means for controlling injection of said thermosettable liquid to such cavities, (d) cooling means associated with the means for controlling the injection of such liquid to such cavities, whereby the temperature of the liquid in such injection means is maintained substantially below the temperature of the mold.

The fiber reinforced composite articles made with the compositions of this invention possess high stiffness and strength. They are particularly suitable for use as appliance housings and as automotive parts.

The hydroxyl terminated polyester oligomer used in the preparation of the polyester of formula (I) can be prepared from reactants other than diols. For example, a hydroxyl terminated oligomer can be obtained by reacting an excess of propylene oxide with an anhydride by the process described in U.S. Pat. No. 3,723,390 patented Mar. 27, 1973. To make the compositions of this invention, the hydroxyl-terminated oligomer must then be further reacted with maleic anhydride in a molar ratio of 0.75 to 1.2 moles of anhydride per hydroxyl group.

The hydroxyl terminated oligomer may also be prepared from the diol and the lower alkyl esters of aromatic dicarboxylic acids, such as dimethyl terephthalate and dimethyl isophthalate as described in UK Patent application No. 2,000,499A, published Jan. 10, 1979.

Minor amounts of diols such as 2,2,4-trimethyl-1,3-pentanediol, 1,4-cyclohexane dimethanol, 1,3-butanediol can be used to prepare the polyesters of formula (I).

Similarly, minor amounts of polyols containing 3 or more hydroxyl groups may be employed such as trimethylol propane, 1,2,6-hexanetriol, and glycerol. When these reactants are used, branched polyesters are formed.

In like manner, modifying amounts of linear saturated diacids such as, adipic acid, suberic acid and azelaic acid may also be used in the practice of this invention. Tricarboxylic acids such as trimellitic acid may also be used.

EXAMPLES

The following examples serve to illustrate specific embodiments of this invention and it is not intended that the invention shall be limited by the examples.

EXAMPLE 1

This example describes the preparation of a predominantly hydroxyl terminated polyester oligomer.

To a 5 liter, 3 necked flask equipped with a paddle stirrer, nitrogen inlet and outlet, thermometer, a 12 inch vacuum jacketed distillation column packed with glass helices with a water cooled condenser above the distillation column, and a heating mantle was charged 885.0 grams (11.5 moles) of propylene glycol and 537.0 grams (4.0 moles) of dipropylene glycol. The solution was heated under nitrogen to 120° C., and then 832.0 grams (5.0 moles) of an 85/15 iso/terephthalic acid mixture was added. The acid number of the reaction mixture was initially 249 mg KOH/g. The mixture was heated at 160° C. for 6.5 hours and at 170° to 190° C. for 4 hours. At this point the reaction mixture was clear. It was heated for an additional 3.0 hours at 180° to 195° C. and then cooled to room temperature. The acid number was 31. The total weight of the sample was 2074 grams (yield=94.5 percent).

EXAMPLE 2

A 572 gram portion of the reaction product produced in Example 1 was heated to 150° C. in a 4 necked, 1 liter flask fitted with a paddle stirrer suitable for vacuum distillation, a distillation head, a thermometer, and an electric heating mantle. A vacuum of 40 mm of mercury was applied and excess diol was removed over a 2 hour period. A total of 150 grams of distillate was collected. The light amber residue in the flask was analyzed. It had an acid number of 11.5 and a hydroxyl number of 114.

285 grams of the residue (which contained 0.58 moles of hydroxyl groups) was reacted with 59.6 grams (0.61 moles) of maleic anhydride in a 1 liter flask equipped with a paddle stirrer, thermometer, nitrogen inlet and outlet, and an electric heating mantle. The stoichiometry of this reaction was 1.0 mole of hydroxyl groups per 1.05 moles of maleic anhydride. The mixture was heated at 115° C. for 2 hours. At the end of this period, a sample was removed for analysis. The acid number of the product was 110 when measured in aqueous pyridine and 101 when measured in a pyridine/methanol mixed solvent. The mixture was treated with 103 mg of hydroquinone followed by the dropwise addition of 282 grams of styrene inhibited with 25 parts per million of t-butyl catechol. The resulting clear light yellow solution was cooled to room temperature. Its viscosity was determined to be 50 centipoises at 25° C.

CONTROL

This example shows the preparation of a typical two stage unsaturated polyester from the same acids and glycols as were used in making the product in Example 2.

A 441 g portion of the hydroxyl-terminated product of Example 1 was heated with 208 g of maleic anhydride for 16 hr. at 200°-210° C. The stoichiometry of this reaction was 1.0 moles of hydroxyl groups per 0.5 moles of maleic anhydride. Water was distilled from the mixture. The resulting polyester had an acid number of 31 and a molecular weight (Mn) of 1707.

A thermosetting resin was prepared by blending the unsaturated polyester with inhibited styrene to give a solution 45 wt. percent monomer. The resin viscosity was 152 centipoises at 25° C.

EXAMPLE 3

Preparation of a Polyester Oligomer from Phthalic Anhydride and Propylene Glycol.

A 2 liter, 4 necked flask fitted with a paddle stirrer, an electric heating mantle, a nitrogen inlet, a thermometer, and a 12 inch vacuum jacked distillation column packed with glass helices was charged with 444.4 grams of phthalic anhydride and 501.7 grams of propylene glycol. The mixture was heated at 180° C. to 225° C. under a gentle flow of nitrogen for 3.5 hours. Then, an additional 50 grams of propylene glycol was added. The mixture was maintained at 225° C. for 3 more hours, and then allowed to cool.

A portion of the product was placed under a vacuum of 40 mm of mercury and heated at 110° C. for 2 hours to remove the excess glycol. The clear, colorless residue was a hydroxyl terminated polyester oligomer. This material possessed a hydroxyl number of 130 and an acid number of 1. The oligomer molecular weight was determined to be 856 by use of the following equation:

$$\overline{Mn} = \frac{112{,}200}{(\text{Acid No.} + \text{Hydroxyl No.})}$$

EXAMPLE 4

The apparatus of Example 2 was charged with 351.8 grams of the polyester oligomer prepared in Example 3 and 79.9 grams (0.815 moles) of maleic anhydride. This stoichiometry afforded one mole of maleic anhydride per mole of hydroxyl group. The mixture was heated at 120° C. for 2 hours. At the end of 2 hours, the product was cooled and analyzed by NMR spectroscopy. This analysis showed that the maleic anhydride containing components of the mixture had the following distribution:

20 mole percent unreacted maleic anhydride,
78 mole percent maleates, and
2 mole percent fumarates.

A portion of this mixture, weighing 235 g, was treated with 192 g of styrene and 0.07 g of hydroquinone. The acid number of this resin was determined to be 69 by the aqueous pyridine method.

EXAMPLE 5

Preparation of a polyester oligomer from maleic anhydride and propylene glycol wherein the hydroxyl terminated polyester oligomer formed contains internal unsaturation.

A 3 necked, 5 liter flask equipped as described in Example 1 was charged with 1204 grams of maleic anhydride and 1969 grams of propylene glycol. The mixture was heated to 168° C. for about two hours, at which point distillate began to appear in the receiver. The mixture was maintained at 170° to 200° C. for two hours. Then the temperature was raised to 225° C. and held there for one hour. The amber solution was then cooled to 180° C. and subjected to a vacuum of 40 mm of mercury for one hour. The residue was inhibited with 0.50 grams of t-butyl catechol and allowed to cool to room temperature under a nitrogen atmosphere. The resulting polyester oligomer had an acid number of 2.3 and a hydroxyl number of 294.

NMR analysis of this polyester showed that the maleic anhydride containing components of the product had the following distribution:

84 mole percent fumarates, and
16 mole percent maleates.

No unreacted maleic anhydride was detected.

EXAMPLE 6

This example describes the reaction of maleic anhydride and a polyester oligomer in the presence of an amine catalyst.

A 2 liter flask equipped as in Example 2 was charged with 1000 grams of the polyester of Example 5 and 514 grams of maleic anhydride. These proportions afforded one mole of anhydride per mole of hydroxyl. The mixture was warmed to 60° C. and stirred as 1.47 ml of N-methylimidazole was added. The mixture immediately turned brown. The reaction temperature increased to 75° C. in 10 minutes without the application of an external heat source. The mixture was maintained at 60° to 75° C. for four hours.

The mixture was cooled and separated into two portions. One portion, weighing 649 grams was treated with 0.13 g of benzoquinone and 0.19 g of hydroquinone and then mixed with 649 grams of styrene. A two-phase liquid mixture resulted, wherein the top layer was styrene monomer. (The acid number of the reaction product not containing styrene was 212 when measured in the pyridine/methanol mixed solvent.)

EXAMPLE 7

This example describes the preparation of a hydroxyl-terminated polyester oligomer containing internal unsaturation.

A 5-liter flask equipped with a paddle stirrer thermometer, nitrogen inlet and outlet, a 12-inch packed distillation column, and an electric heating mantle was charged with 294 g of maleic anhydride, 443 g of phthalic anhydride, 1249 g of neopentyl glycol, and 228 g of propylene glycol. The mixture was carefully warmed to melt all of the reactants. Then it was heated at 180°-206° C. for nine hours as 84 g of water distilled from the mixture. The residue in the flask was then heated under vacuum to remove excess glycol and additional water. Almost all of the glycol in the distillate was neopentyl glycol. The oligomer remaining in the flask had a hydroxyl number of 246, and an acid number of 19 in aqueous pyridine. NMR analysis revealed that the ratio of maleate to fumarate ester groups in the oligomer was about 3 to 7. The molar ratio of neopentyl glycol to propylene glycol in the product was 2.6 to 1.

EXAMPLE 8

A 275 g portion of the unsaturated oligomer prepared in Example 7 was reacted with 118 g of maleic anhydride in the presence of 0.4 g of pyridine for 2 hours at 90° C. The amber product was cooled to 70° C. and blended with 393 g of styrene containing 0.20 g of methyl hydroquinone. This resin had a viscosity of 27 centipoises at 25° C. and an acid number of 87 mg of KOH/g in a pyridine/methanol mixed solvent.

EXAMPLE 9

A thermosetting resin mixture was prepared from the following:

300 grams of the mixture prepared in Example 2,
3.2 grams of t-butyl perbenzoate, and
0.96 grams of Zelec UN mold release (an organophosphate mold release sold by E. I. duPont de Nemours, Wilmington, Del.).

EXAMPLE 10

A thermosetting resin mixture was prepared from the following:

300 grams of the mixture prepared in Example 4,
3.0 grams of t-butyl perbenzoate, and
0.90 grams of Zelec UN.

EXAMPLE 11

A thermosetting resin mixture was prepared by blending the following:

100 grams of the composition of Example 2,
50 grams of the composition of Example 6,
1.5 grams of t-butyl perbenzoate, and
0.75 grams of Zelec UN.

This mixture was homogeneous.

EXAMPLE 12

A thermosetting resin mixture was prepared by blending the following:

150 grams of the mixture of Example 8,
1.5 grams of t-butyl perbenzoate, and
0.75 grams of Zelec UN.

CONTROL

A thermosetting resin mixture was prepared by blending the following:

160 grams of the mixture of the Control,
1.0 parts of t-butyl perbenzoate, and
0.5 parts of Zelec UN.

EXAMPLE 13

A series of fiber reinforced rigid composites (Composites A to E in the Table) were prepared by injecting a thermosetting resin composition (prepared as in Examples 9 through 12 and the Control) into a web of randomly oriented one to two inch glass fibers compressed in a mold. The dimensions of the mold cavity were $8\times8\times\frac{1}{8}$ inches (for the composites formed from the resins of the Control and Example 12, the mold cavity was $7\times7\times\frac{1}{8}$ inches). The mold cavity was filled with 5 or 6 plies of Type AKM glass mat (supplied by PPG Industries, Pittsburgh, Pa.). A thermosetting resin mixture was injected into the web of glass fibers under pressure in a period of 20 seconds or less. The pressure in the mold was 30 psi to 250 psi. The resin penetrated the glass web and wet the fibers before it formed a thermoset composition. The resin was cured for a period of time as shown in the Table after the resin was injected. The mold was then opened and a cured composite part was removed. The part was tested for flexural strength and flexural modulus according to the ASTM D790.

The Table shows the resin used, the cure time and the properties of the composite formed.

TABLE

| | COMPOSITE PROPERTIES | | | | |
|---|---|---|---|---|---|
| Composite | A | B | C | D | E |
| Resin | Example 9 | Example 10 | Example 11 | Example 12 | Control |
| Cure time (min.) | 10 | 5 | 5 | 2 | 2 |
| Mold Temperature (°C.) | 135 | 135 | 135 | 140 | 140 |
| COMPOSITE PROPERTIES | | | | | |
| GLASS CONTENT (wt %) | 51 | 55 | 61 | 53 | 53 |
| FLEXURAL STRENGTH (psi) | 40,700 | 36,000 | 46,800 | 38,300 | 28,300 |
| FLEXURAL MODULUS ($10^6$ psi) | 1.49 | 1.64 | 2.21 | 1.73 | 1.39 |

The data in the Table show that the composite articles made with the compositions of this invention (Composites A to D) possess properties that are superior to those obtained with the Control (Composite E).

EXAMPLE 14

Effect of 2 hour water boil on composite properties

Test specimens, $1\times3\times\frac{1}{8}$ inch, of composite A prepared in Example 13 were tested for retention of properties and water sorption characteristics by boiling in water for 2 hours.

The retention of flexural strength and modulus was determined by comparing the properties of a test specimen from the same composite before and after the water boil test. Water sorption is the percent increase in weight of the sample after boiling. The results are set forth as follows:

| PROPERTIES OF COMPOSITE A | As Made | After 2 hr. water boil |
|---|---|---|
| FLEXURAL STRENGTH (psi) | 40,700 | 36,000 |
| FLEXURAL MODULUS ($10^6$ psi) | 1.49 | 1.51 |
| WATER SORPTION (%) | — | 0.3 |

This data shows that the retention of flexural strength and modulus is good and that water sorption is low.

What is claimed is:

1. A curable molding composition comprising a mixture of:

(a) a polyester of the following formula $$[HO\overset{\overset{O}{\|}}{C}CH{=}CH\overset{\overset{O}{\|}}{C}{-}O\,]_{n}R{-}(OH)_m \qquad (I)$$

wherein n has an average value between 1.5 and 2, m is 2-n, R is the hydroxyl-free residue of a predominantly hydroxyl terminated polyester having a molecular weight not exceeding about 1500 and obtained by the condensation of a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, the ethylene and propylene oxide derivatives of 2,2-bis(4-hydroxyphenyl)propane, and mixtures thereof, and mixtures of ethylene glycol and said diols, with a dicarboxylic acid or anhydride selected from the class consisting of maleic acid and anhydride, fumaric acid, ortho-phthalic acid and anhydride, isophthalic acid, terephthalic acid, carbic acid and anhydride, and mixtures thereof, (b) maleic anhydride, (c) an ethylenically unsaturated monomer which forms a homogeneous mixture with and is copolymerizable with (a) and (b) and (d) one or more reinforcing fibers having a melting point or a glass transition temperature above about 130° C.

2. A composition as in claim 1 wherein the combination of polyester (a) and maleic anhydride (b) are present in amounts of from about 25 to about 95 weight percent of the resinous portion.

3. A composition as in claim 1 wherein the ethylenically unsaturated monomer is styrene.

4. A composition as in claim 1 wherein the ethylenically unsaturated monomer is present in amounts of from about 5 to about 75 weight percent of the resinous portion.

5. A composition as in claim 1 wherein the reinforcing fiber is selected from fiberglass, carbon fibers, or polyamide fibers.

6. A composition as in claim 1 wherein the composition contains from about 15 to about 80 weight percent of the reinforcing fiber.

7. A cured article prepared from the composition of claims 1, 5, or 6.

* * * * *